Aug. 25, 1931.  G. E. NERNEY  1,820,627
EYEGLASS CONSTRUCTION
Filed Dec. 24, 1926
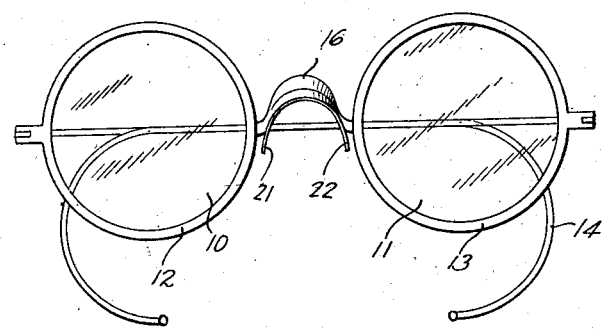
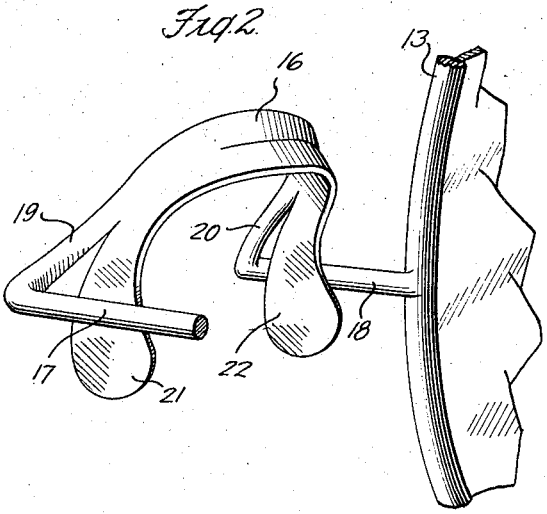
INVENTOR
George E. Nerney
BY
Robert S. Blair  ATTORNEY Patented Aug. 25, 1931

1,820,627

UNITED STATES PATENT OFFICE

GEORGE E. NERNEY, OF ATTLEBORO, MASSACHUSETTS, ASSIGNOR TO BAY STATE OPTICAL COMPANY, OF ATTLEBORO, MASSACHUSETTS, A CORPORATION OF MAINE

EYEGLASS CONSTRUCTION

Application filed December 24, 1926. Serial No. 156,855.

This invention relates to eyeglass construction and more particularly to a bridge construction for eyeglass frames.

One of the objects of the invention is to provide an eyeglass frame which is supported upon the wearer in a manner conducive to great comfort. Another object is to provide a bridge construction for eyeglasses capable of a wide range of adjustment to meet various conditions of use. Another object is to provide a construction of the above nature wherein certain important adjustments may be made without interference with other important adjustments. Another object is to provide a construction of the above nature which is strong and rugged and which, in practical use, is capable of dependably retaining the shape to which it is adjusted to fit the wearer. Another object is to provide a construction of the above nature which is neat in appearance. Other objects will be in part obvious or in part pointed out hereinafter.

The invention accordingly consists in features of construction, combinations of elements, and arrangements of parts as will be exemplified in the structure to be hereinafter described and the scope of the application of which will be indicated in the following claims.

In the accompanying drawings in which is shown one of the various possible embodiments of this invention, Figure 1 is a front elevation of an eyeglass frame, and Figure 2 shows the bridge construction in perspective and in enlarged detail.

Similar reference characters refer to similar parts in both views of the drawings.

Referring now to Figure 1 of the drawings in detail, there is shown a pair of eyeglass lenses 10 and 11 which are supported in rims 12 and 13 respectively. These rims are provided with temple bars 14 and 15 of any desired construction. The rims 12 and 13 shown herein are of metal, but it is to be understood that the features of this invention are adapted for use in an eyeglass frame having rims of any desired construction or, if desired, the frame may be rimless, the temple bars and bridge being secured to the lenses by any suitable mounting.

The rims 12 and 13, or the lenses 10 and 11, are connected by a bridge construction which is adapted to hold the lenses in predetermined position with respect to one another and which is adapted to support the weight of the eyeglasses upon the nose of the wearer. The temple bars 14 and 15, passing over the ears or engaging the skull, prevent the eyeglasses from slipping forwardly out of position. For uniformity of description it may be here noted that the direction "forwardly" will be employed herein to denote a direction away from the face of the wearer substantially along the line of vision, the term "rearwardly" being employed to denote the opposite direction; the terms "inwardly" and "outwardly" will be employed to denote respectively directions toward and away from the sides of the nose.

Referring now to Figure 2, the bridge construction is shown in detail. The bridge is preferably made of one piece of metal. A crest portion 16 is shaped to arch or curve over the crest or ridge of the nose and thence extends downwardly on both sides along the side portions of the nose. Extending rearwardly from the lenses 10 and 11, and in this instance connected at their forward ends in any suitable manner to the respective rims 12 and 13, are a pair of shank portions 17 and 18. The rear ends of these shank portions are connected to the crest portion 16 by connecting portions 19 and 20 which are inclined upwardly and forwardly and also inwardly. These connecting portions 19 and 20 merge smoothly into the contour of the crest portion 16, meeting the crest portion 16 along the rear edge of its downwardly extending side portions.

The downwardly extending sides of the crest 16 terminate in flattened and preferably widened end portions 21 and 22 which are adapted to rest against the sides of the nose. These parts or end portions 21 and 22 are adapted to support against the sides of the nose substantially the entire weight of the eyeglasses, the arch of the crest portion 16 preferably resting lightly against the crest of the nose with very little or no pressure at all.

The connecting portions 19 and 20 between the shanks 17 and 18 and the sides of the crest portion 16 join the crest portion at points well above the flat end portions 21 and 22. The construction is effected by the downwardly extending sides of the crest portion 16 being split longitudinally, the parts on the front sides of the splits being extended downwardly and terminating in the flattened portions 21 and 22 and the parts on the rear sides of the splits providing the connecting portions 19 and 20 which are joined to the rear ends of the shank portions 17 and 18. The flattened portions 21 and 22 preferably extend downwardly below the shank portions 17 and 18 and are positioned inside of these portions, and the shank portions 17 and 18 preferably extend rearwardly past the portions 21 and 22.

This bridge construction may be adjusted with the greatest convenience to suit any shape of nose and to provide any pupillary distance within ordinary ranges. By bending or twisting the portions 21 and 22 these parts may be brought to rest smoothly and comfortably upon the sides of the nose. By manipulation of the shank portions 17 and 18 with the portions 19 and 20, the pupillary distance and the position of the lenses with respect to one another may be adjusted throughout a wide range. Moreover, it will be seen that these two adjustments are accomplished substantially entirely independently of one another, the making of one adjustment not interfering with the other adjustment. For example, the parts 21 and 22 may be bent or twisted to fit a very wide nose; thereupon, without interfering with the adjustment given the parts 21 and 22, the position of the lenses with respect to one another may be adjusted by means of the parts 17, 18, 19 and 20 to give a wide pupillary distance or a narrow pupillary distance as the case requires. In addition, the wearer himself, if the eyeglasses do not seem to rest comfortably upon his nose, may adjust the parts 21 and 22 for a more comfortable bearing without disturbing the important relation of the lenses one to the other.

In addition to the convenience of adjustment discussed above, it will be seen that this bridge construction connects the lenses in such manner that they are held with great firmness and are not apt to become sprung out of proper alinement in ordinary use. The connection between the lenses is directly through the shank portions 17 and 18, the parts 19 and 20 and the crest portion 16. The wide and flattened portions 21 and 22, supporting the weight of the eyeglasses upon the sides of the nose, make for the greatest comfort, relieving the unpleasant pressure at the crest or ridge of the nose. These end portions or supporting portions 21 and 22 in addition to being widened and flattened are preferably thinned toward their ends so that they rapidly radiate heat and are thus further conducive to comfort. They are not made so light and thin, however, that they are apt to lose in use the shape to which they are adjusted for the most comfortable fitting.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim as my invention:

1. In a bridge construction for eyeglasses, in combination, a crest portion curving over the crest of the nose and adapted to rest upon the nose and thence extending downwardly on both sides of the nose, each of said downwardly extending side portions being integral with said crest portion and split lengthwise, the part thereof on the forward side of the split continuing downwardly to form with said crest portion a nose piece adapted to rest against the nose substantially throughout the entire length of the nose piece to support the weight of the eyeglasses, and the part thereof on the rear side of the split being extended forwardly in a shank to be connected to the lens mounting, the upper end of said split being spaced a substantial distance above said shank.

2. In a bridge construction for eyeglasses, in combination, a crest portion curving over the crest of the nose and thence extending downwardly on both sides of the nose, each of said downwardly extending side portions being integral with said crest portion and split lengthwise, the part thereof on the forward side of the split continuing downwardly to provide a downwardly extending flattened and widened portion adapted to rest against the side of the nose to support the weight of the eyeglasses, and the part thereof on the rear side of the split being extended forwardly in a shank to be connected to the lens mounting, the upper end of said split being spaced a substantial distance above said shank.

3. A bridge construction for eyeglasses comprising a member having a portion arched over the crest of and adapted to rest upon the nose and extending one either side downwardly and rearwardly along the side of the nose and thence bent forwardly to provide a forwardly extending substantially horizontal shank portion to be connected at its forward end to the lens mounting, said downwardly and rearwardly extending portions each having a downwardly extending part joined thereto at the front edge thereof and at points a substantial distance above the level of said shanks, the lower ends of said last parts extending on the inner side of said shanks and being adapted to rest against the sides of the nose.

4. A bridge construction for eyeglasses comprising a member having a portion arched over the crest of and adapted to rest upon the nose and extending on either side downwardly and rearwardly along the side of the nose and thence bent forwardly to provide a forwardly extending substantially horizontal shank portion to be connected at its forward end to the lens mounting, said downwardly and rearwardly extending portions each having formed integrally therewith at the front edge thereof and at points a substantial distance above the level of said horizontal shanks a downwardly extending part adapted to rest against the side of the nose, the lower ends of said last parts extending on the inner side of said shanks and terminating below the level of said shanks.

5. A bridge construction for eyeglasses comprising a member having a portion arched over the crest of and adapted to rest upon the nose and extending on either side downwardly and rearwardly along the side of the nose and thence bent forwardly to provide a forwardly extending substantially horizontal shank portion to be connected at its forward end to the lens mounting, said downwardly and rearwardly extending portions each having split and projecting therefrom at the front edge thereof and at points a substantial distance above the level of said horizontal shanks a part curving therefrom downwardly and forwardly and adapted to rest against the side of the nose, said last parts having flattened and widened lower end portions.

6. A bridge construction for eyeglasses comprising a relatively wide portion arching over and resting against the crest of the nose, and two portions extending downwardly from said crest portion along the side of the nose one forwardly of the other, the rear portion being relatively narrow and extending downwardly and rearwardly and thence bent sharply to extend forwardly exteriorly of said forward portion and substantially horizontally and connected at its forward end to the lens mounting, the forward portion being relatively wide and flattened at its lower part for bearing against the side of the nose and being narrowed at its upper part, the upper ends of said two portions extending in the same general direction and merging together into said relatively wide crest portion.

7. A bridge construction for eyeglasses comprising a relatively wide portion arching over and resting against the crest of the nose, and two portions extending downwardly from said crest portion along the side of the nose one forwardly of the other, the rear portion being relatively narrow and extending downwardly and rearwardly and thence bent sharply to extend forwardly exteriorly of said forward portion and substantially horizontally and connected at its forward end to the lens mounting, the forward portion being relatively wide and flattened at its lower part for bearing against the side of the nose, the part of said forward portion above said widened lower part thereof curving forwardly toward its upper end and the upper end thereof approaching the upper part of said rear portion and merging thereinto at an acute angle.

8. A bridge construction for eyeglasses comprising a relatively wide portion arching over and resting against the crest of the nose, and two portions extending downwardly from said crest portion along the side of the nose one forwardly of the other, the rear portion being relatively narrow and extending downwardly and rearwardly and thence bent sharply to extend forwardly exteriorly of said forward portion and substantially horizontally and connected at its forward end to the lens mounting, the forward portion being relatively wide and flattened at its lower part for bearing against the side of the nose, the rear edge of said forward portion curving forwardly at the upper part thereof and joining the front edge of said rear portion at a point above said horizontally extending part of the latter and at an acute angle, the front edge of said forward portion curving forwardly at the upper part thereof and merging into the front edge of said crest portion to form therewith a smooth curve.

9. A bridge construction for eyeglasses, comprising a relatively broad band forming an arch over the crest of the nose and bifurcated at an acute angle upon each side of the nose slightly below the crest, the rearward bifurcated parts on each side extending first downwardly, rearwardly and outwardly, and then bending sharply forwardly to provide a shank for connection at its forward end to the lens mounting, and the forward bifurcated parts on each side curving downwardly and terminating in a spatulate end positioned below and inwardly of the adjacent shank.

In testimony whereof, I have signed my name to this specification this 13th day of December, 1926.

GEORGE E. NERNEY.